United States Patent
Fang

(10) Patent No.: US 8,566,363 B2
(45) Date of Patent: Oct. 22, 2013

(54) ONTOLOGY EXPANSION

(75) Inventor: Jun Fang, Xi'an (CN)

(73) Assignee: Empire Technology Development LLC, Wilmington, DE (US)

( * ) Notice: Subject to any disclaimer, the term of this patent is extended or adjusted under 35 U.S.C. 154(b) by 6 days.

(21) Appl. No.: 13/376,804

(22) PCT Filed: Feb. 25, 2011

(86) PCT No.: PCT/CN2011/071298
§ 371 (c)(1),
(2), (4) Date: Dec. 7, 2011

(87) PCT Pub. No.: WO2012/113150
PCT Pub. Date: Aug. 30, 2012

(65) Prior Publication Data
US 2012/0278363 A1 Nov. 1, 2012

(51) Int. Cl.
*G06F 17/30* (2006.01)

(52) U.S. Cl.
USPC .......................................... 707/802

(58) Field of Classification Search
USPC .......................................... 707/802
See application file for complete search history.

(56) References Cited

U.S. PATENT DOCUMENTS

2003/0177000 A1* 9/2003 Mao et al. .................. 704/9
2011/0078205 A1* 3/2011 Salkeld et al. ............. 707/794

FOREIGN PATENT DOCUMENTS

| CN | 1877566 A | 12/2006 |
|---|---|---|
| CN | 101819583 A | 9/2010 |
| KR | 2009-0080823 A | 7/2009 |

OTHER PUBLICATIONS

Gelfand et al., "Automated Concept Extraction From Plain Text", 1998, AAAI Technical Report WS-98-05, pp. 13-17.*
Banerjee et al., "Extended Gloss Overlaps as a Measure of Semantic Relatedness", 2003, Proceedings of the Eighteenth International Joint Conference on Artificial Intelligence, pp. 805-810, Acapulco, Mexico, (Aug. 2003).*
International Search Report dated Nov. 3, 2011 as received in related application No. PCT/CN2011/071298.
CIRCA Technology: Applying Meaning to Information Management an Applied Semantics Technical White Paper; http://www.adrenalyn.com.au/circa-semantics-technology.htm; retrieved Mar. 3, 2010.
Dr. A Copestake, Automatic ontology augmentation: evaluation issues, Apr. 1, 2009,http://gow.epsrc.ac.uk/ViewGrant.aspx?GrantRef=EP/G00692X/1.
Tim Berners—Lee, J. Hendler, and O. Lasilla. The Semantic Web. Scientific American, May 2001.
S. Patwardhan, S. Banerjee and T. Pedersen. Using Semantic Relatedness for Word Sense Disambiguation. In Proceedings of the Fourth International Conference on Intelligent Text Processing and Computational Linguistics (CiCLING—03). Mexico City, Mexico. 2003.
Lin D. 1998. An information-theoretic definition of similarity. In Proceedings of the 15th International Conference on Machine Learning. Madison, WI.

(Continued)

*Primary Examiner* — Hung Q Pham
(74) *Attorney, Agent, or Firm* — Maschoff Brennan

(57) ABSTRACT

Techniques for ontology expansion are provided. In one disclosed method, an ontology is first identified. Terms in the ontology are disambiguated to identify term senses. Additional senses are identified using a lexical database. The additional senses are then added to the ontology to generate an augmented or expanded ontology.

25 Claims, 8 Drawing Sheets

(56) References Cited

OTHER PUBLICATIONS

Jones, A.B. et al., "A Heuristic-Based Methodology for Semantic Augmentation of User Queries on the Web," Conceptual Modeling—ER 2003, Lecture Notes in Computer Science, vol. 2813, pp. 476-489, 2003.

Zhou, L. et al., "A method for semantics-based conceptual expansion of ontology," Proceedings of the 2008 ACM symposium on Applied computing, pp. 1583-1587, 2008.

\* cited by examiner

ONTOLOGY EXPANSION

BACKGROUND

The World Wide Web ("Web") provides a wealth of information and services to people around the world. The ability to discover information from around the globe often requires no more than a click of a mouse. At the same time, the Web is best suited for use by people. For example, tasks such as finding a specific translation of a word, searching for the lowest price on an item for sale, or making reservations at a restaurant or with an airline are often difficult for a machine to accomplish without human assistance.

As a result, work is being done to make the Web more understandable. The Semantic Web, for example, tries to provide a framework to make the Web more understandable to both humans and machines by defining the meaning of information and services available on the Web. The goal is to enable the understanding and satisfaction of requests from various sources. The Semantic Web aims to enable machines, for example, to perform some of the tasks that are performed by humans today.

Making the Web more understandable has many applications that include data integration, data classification, searching, content rating, data description, or the like. In order for these applications to come to fruition, however, it is necessary to identify the meaning or semantics of data and/or services on the Web.

One of the tools used to determine the semantics of data and services on the Web is ontologies. Ontologies are used to express relationships among resources. For instance, there are many different terms that can be used to describe the same things in various data sets. Ontologies can identify these relationships and make it easier to determine the semantics of these data sets. Unfortunately, constructing ontologies is a labor intensive and costly process. In addition, ontologies are often incomplete and unfocused.

SUMMARY

Embodiments relate to ontology construction and more particularly to expanding ontologies. In one embodiment, a method for expanding an ontology may include identifying or selecting the ontology. The ontology may be a part of an existing ontology. After the ontology is selected, the selected ontology is disambiguated, which may include disambiguating terms in the ontology to identify term senses. The disambiguation of the terms may include the use of context to identify additional senses to be included in the expansion of the ontology. The ontology is then expanded with the additional senses related with the identified senses.

In another embodiment, a method for expanding an ontology includes identifying a nearest word set and/or a context for each term in the ontology. A term sense for each term is determined and the terms senses are disambiguated using multiple sense sets and the nearest word set and/or context to identify additional senses. An augmented ontology is then generated by expanding the ontology with the additional senses. In some instances, the ontology can be refined, for example, by merging and/or removing unnecessary links.

In another embodiment, a system for generating an expanded or augmented ontology from an ontology includes a lexical database and a disambiguation component. The lexical database stores multiple elements in sense sets. The disambiguation component expands the ontology using the sense sets in the lexical database to generate the augmented ontology. The disambiguation component identifies sense sets and determines a relatedness score between each term sense in the ontology and each of the elements in the sense sets. In one example, candidates are identified or generated from the sense sets. Each candidate includes may include an element from one of the sense sets. The elements in the candidate that has the best or maximum relatedness score is added to the ontology. More generally, elements whose relatedness score exceeds a threshold relatedness score are added to the ontology to generate the augmented ontology.

In another example, a method for augmenting an ontology includes identifying an ontology to augment, disambiguating the ontology to generate a disambiguated ontology, augmenting the disambiguated ontology to generate an augmented ontology, and refining the augmented ontology. The disambiguated ontology can be augmented, for example, using relations between senses and/or gloss between senses.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
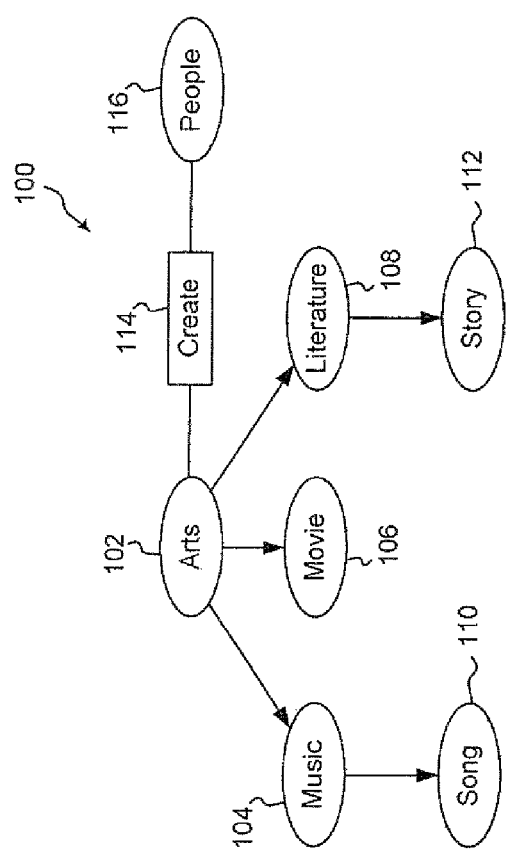
FIG. 1 illustrates an example of an ontology.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Embodiments disclosed herein relate to ontology construction including ontology expansion. An ontology can define concepts (e.g., words, terms) and roles, for example, in an area of knowledge. The ontology can provide the information (e.g., axioms) needed to relate words or terms that are used in the area of knowledge. By providing relationships among words or terms, the ontology can be used to make the Web more understandable to both humans and machines. Ontology expansion improves, for example, the Semantic Web by refining relationships and/or adding to relationships in existing ontologies.

Generally, ontology expansion or ontology augmentation may include identifying or selecting an ontology or a fragment of the ontology. Next, each term in the identified ontology is disambiguated and clarified as a term sense. The disambiguation process uses information from the context of each term to determine which sense (or senses) of a given term is being used in the ontology. Then, the ontology can be expanded by appending terms which are related to term senses in the clarified ontology.

FIG. 1 illustrates an example of an ontology 100. The ontology 100 includes concepts and roles in this example. The concepts and roles are examples of the terminological aspects of the ontology 100 (e.g., a TBox and/or ABox). The concepts and roles can be expressed in various ways. FIG. 1 illustrates the concepts and roles in a graphical form. However, the ontology 100 can also be represented using statements, as a set of classes and properties, or the like.

The ontology 100 may be a portion or fragment of a larger ontology. In this example, the ontology 100 may correspond to a fragment or portion of an arts ontology. The ontology 100 may contain two kinds of terms: a concept term and a role term. Each node in the ontology 100 identifies a term and, as depicted in FIG. 1, the ontology 100 includes concept terms 102, 104, 106, 108, 110, 112, and role term 114. In FIG. 1, the term 102 is arts. As further described herein, disambiguating the term 102 is substantially the same as disambiguating the word or term "arts" in this example. Thus, the words or terms in the ontology 100 are examples of concepts.

The term 102 includes an arts concept and the terms 104, 106, and 108 include, respectively, movie, music, and literature concepts. In this example, the terms 104, 106, and 108 are each a subclass of the term 102. The term 102 is a superclass of the terms 104, 106, and 108. The terms 110 and 112 include, respectively, song and story. The terms 110 and 112 are subclasses of, respectively, the tents 104 and 108.

The ontology 100 also includes a term 116, which is people. In this example, the terms 102 and 116 are associated by a role term 114, which is create in this example. The role term 114 may indicate that some instances of the term 102 and some instances of the term 116 have the relation or role term 114 of create. As previously stated, the ontology 100 may include an ABox, a TBox, axioms, or the like that identify the concepts and/or roles illustrated graphically in FIG. 1.

The ontology 100 can be selected from existing ontologies or created without reference to existing ontologies. After the ontology 100 has been identified or selected for expansion, the terms 102, 104, 106, 108, 110, 112, 114, and/or 116 in the ontology 100 are clarified. Clarification of the ontology 100 often includes identifying term senses that correspond to the terms or words in the ontology 100. Identifying the term senses includes disambiguating term senses by taking other terms in the ontology as context. In other words, other terms in the ontology 100 may provide a context for disambiguating terms senses.

When disambiguating a word (or more generally a term), the meaning of the word may be selected from a selection of sense possibilities. The sense possibilities may be predetermined and may be stored in a lexical database. In other words, the lexical database may store term senses. The lexical database may group words or term senses into groups or sense sets. For example, the words in the lexical database may be grouped into sense sets. The sense sets may also provide definitions and provide relationships between the words in the sets and between different sets. The lexical database can be used to disambiguate both concept terms and role terms.

The sense sets in the lexical database may reflect relationships between a term sense and other term senses. Examples of sense sets for nouns in the lexical database may include, by way of example only, hypernyms, hyponyms, holonyms, meronyms, or the like. Relationships or sense sets for verbs may include hypernyms, troponyms, or the like. Relationships or sense sets for adjectives may include related nouns, participles, or the like. Relationships or sense sets for adverbs may include root adjectives. Words may also be connected through other lexical relationships, including antonyms.

More generally, the lexical database typically stores lexical information about words and information about the meanings of words. The lexical database can distinguish between different types of speech (nouns, verbs, adjectives, adverbs), identify collocations, provide definitions, or the like. The lexical database provides data for assigning senses to words in context. The lexical database may include morphemes, part of speech designation, sample usage, cultural annotations, semantic relationships with other words and morphemes.

When provided with context, the lexical database can be used to identify term senses that are similar to a test word or a test term. Words that occur together in an ontology (e.g., in the ontology 100) are often related to some degree and the disambiguation of words or terms takes other words or terms in the ontology 100 into account. The right sense is assigned to a target word or target term by maximizing the relatedness between the target word and its context, which may be obtained from the ontology 100.

Disambiguating the ontology may disambiguate all of the terms in the ontology at the same time or substantially at the same time. When obtaining the correct word or term senses for words or terms in the ontology, let word set T= $\{t_1, \ldots, t_i, \ldots, t_n\}$ be all words in the ontology, and let ST= $\{st_1, \ldots, st_j, \ldots st_m\}$ be all possible sense combination sets for these words. The cardinality of ST is the product of cardinalities of all sense set Sense($t_i$). Sense($t_j$) denotes all possible senses of word $t_i$. In this example, $st_j = \{s_{j,1}, \ldots, s_{j,i}, \ldots, s_{j,n}\}$ is one possible combination of all senses. The sense set st which has the maximum relatedness score is chosen as the correct sense for all words in the ontology. In one example, the following formula determines the total relatedness among all sense $s_{j,i}$.

$$\Sigma Rel(s_{j,i}, s_{j,k}), \forall k, j (i > k).$$

For example, an ontology may contain three terms: a, b, and c. Each of the terms a, b, and c, have possible term senses $a_1, a_2, b_1, b_2$ and $c_1, c_2, c_3$ in the lexical database, which can be used to disambiguate the terms in the ontology.

The disambiguation of the terms may occur as follows, by way of example only. First, the potential disambiguation results or candidates are $\{a_1, b_1, c_1\}$, $\{a_1, b_1, c_1\}$, $\{a_1, b_1, c_3\}$, $\{a_1, b_2, c_1\}$, ... $\{a_2, b_2, c_3\}$. There may be 12 candidates in this example.

Next, a relatedness score is determined or calculated for each candidate. The final or ultimate relatedness score may include a sum of relatedness scores among all pairs in a candidate. For instance, the relatedness score for the candidate $\{a_1, b_1, c_1\}$ is $Rel(a_1, b_1) + Rel(a_1, c_1) + Rel(b_1, c_1)$;

The candidate with the maximum relatedness score or the best relatedness score is the result of the disambiguation. The candidate with the maximum or best relatedness score can be expressed as $\{a_i, b_j, c_k\}$. The desired sense of the terms a, b, c is $a_i, b_j$ and $c_k$.

Given two senses $s_{j,i}$ and $s_{j,k}$, the relatedness score $Rel(s_{j,i}, s_{j,k})$ can be obtained as described in "S. Banerjee, T.

Pedersen, Extended gloss overlaps as a measure of semantic relatedness, in: Proceedings of the Eighteenth International Joint Conference on Artificial Intelligence, Acapulco, 2003, pp. 805-810, which is incorporated herein by reference in its entirety.

The relatedness scores can be used to identify semantic relatedness to obtain a sense for every word in the ontology. A relatedness score can be measured by using an extended gloss overlap method in one embodiment. The extended gloss overlap method computes the relatedness between two input senses A and B by comparing the glosses of senses that are related to A and B through relations provided in the lexical database.

Let RELS(A) be a set of relations that include one or more of the relations defined in the lexical database for the sense A, i.e., RELS(A)={r|r is a relation defined in the lexical database for A}. Each relation r in RELS has a function of the same name that accepts a sense as input and returns the gloss of the senses related to the input senses by the designated relation. For example, assume r represents the hypernym relation, then r(A) returns the gloss of the hypernym synset of A.

The score( ) is a function that accepts as input two glosses, finds the phrase that overlaps words between them and returns a score. When comparing two glosses, pronouns, prepositions, articles and/or conjunctions are often dropped. The sizes of the overlaps found are added together to arrive at the score for the given pair of glosses.

The relatedness score between the input senses A and B can be determined as follows, where gloss(A) denotes the gloss of A.

$$Rel(A, B) = \frac{score(gloss(A), gloss(B)) + \sum score(r(A), r(B)), \forall r \in (RELS(A) \cap RELS(B))}{0.5 \times (|gloss(A)| + |gloss(B)|)}$$

Figure 2:
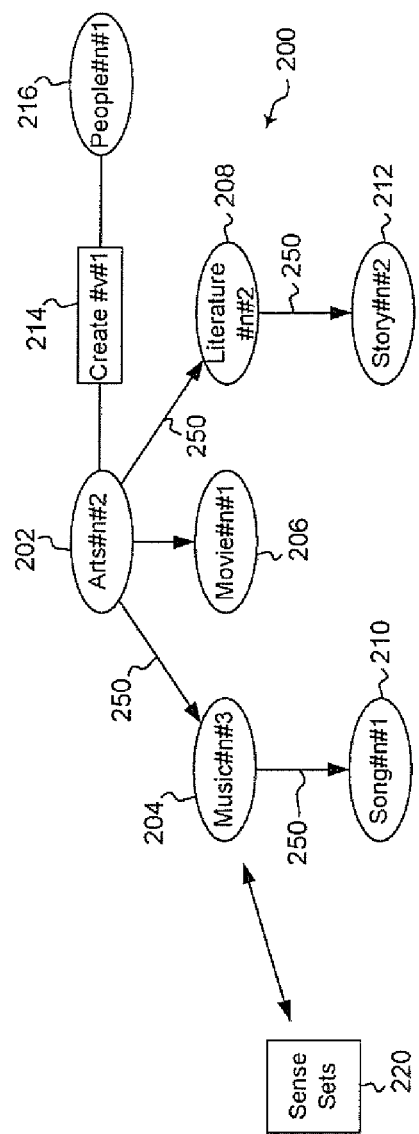
FIG. 2 illustrates an example of the ontology of FIG. 1 after the terms have been disambiguated.

FIG. 2 is an example of the ontology after the terms have been disambiguated. In other words, FIG. 2 illustrates an ontology 200 represented by senses or term senses while FIG. 1 illustrates the ontology 100 represented by terms. The ontology 200 is clarified in part because the ontology 200 illustrates term senses rather than terms. For example, an arts term sense 202 corresponds to the art term 102 after disambiguation in one embodiment. Each of the term senses illustrated in FIG. 2 may include and/or be associated with sense sets 220. The sense sets 220 may be different for each of the term senses and may be separated such that the sense sets of a particular term sense are only associated with that term sense. Similarly, the other nodes in the ontology 200 include or represent term senses, which may also be expressed as words in one embodiment and also include or be associated with their own sense sets. The arrows 250 identify subclasses and/or superclasses for each term sense. For example, the term sense 208 is a subclass of the term sense 202 and a superclass of the term sense 212.

When the ontology 200 is clarified, a lexical database and a relatedness score measurement can be used to augment these term senses. As previously stated, the lexical database may include relationships or sense sets between word senses such as hypernymy sense sets, hyponymy sense sets, antonymy sense sets, synonymy sense sets, meronymy sense sets, holonymy sense sets, or the like.

In one example of ontology expansion, a subset of these relationships is used to perform word or term augmentation: hypernym(X), hyponym(X), and synonym(X), where X is the sense. The lexical database can be used to identify the following sense sets:

hypernym(X)={a1, a2, . . . };
hyponym(X)={b1, b2, . . . }; and
synonym(X)={c1, c2, . . . }.

These sense sets include elements that are candidates to generate ontology augmentation. Generally, when a relatedness score for an element in one of the sense sets exceeds a threshold or predetermined value, then the corresponding element may be added to a class of the sense. In one example, the corresponding element can be added to a superclass, a subclass, or an equivalent class. In one example, the corresponding elements may be added as term senses in the ontology being augmented.

Hypernyms typically identify senses that have a broader meaning than the sense. As a result, elements from the hypernym sense set are typically added to a superclass or added as senses that have a superclass relationship to the sense being evaluated. Hyponyms typically identify senses that have a more specific meaning and elements from the hyponym sense set are typically added to a subclass of the senses being evaluated. Synonyms typically identify words that are similar semantically to the sense being disambiguated. As a result, elements from the synonym sense set may be added as siblings or as an equivalent class of the sense or as sibling senses in the ontology.

The elements selected from the sense sets, as previously mentioned, are those that have sufficient relatedness based on some measurement, such as a relatedness score. More specifically, a hypernym relatedness score can be obtained between X and each element {a1, a2, . . . }. When the hypernym relatedness score is greater than a predetermined hypernym value, then the corresponding element is appended to a superclass set of X. A hyponym relatedness score can also be determined between X and each element {b1, b2, . . . }. When the hyponym relatedness score is greater than a predetermined hyponym value, then the corresponding element is appended to a subclass of X. Each element in synonym(X) is directly placed into a sibling set or equivalent class of X, as synonyms are the most related.

As discussed previously, ontology expansion may begin with ontology disambiguation. After the ontology is disambiguated, each sense in the disambiguated ontology is augmented using information related to the sense in the lexical database. As described in more detail herein, augmentation may include one or more steps.

The ontology may be augmented using relation. For every sense, by way of example only, hypernymy, hyponymy and synonym relations are used to augment the sense. In this case, hypernym(X) hyponym(X) and synonym(X) represent the result sense sets relation to word sense X—hypernym(X)= $\{a_1, a_2, \ldots\}$, hyponym(X)=$\{b_1, b_2, \ldots\}$ and synonym(X)=$\{s_1, s_2, \ldots\}$ If a relatedness score between X and an element in the sense set $\{a_1, a_2, \ldots\}$ is greater than a hypernym value, the element is appended to the superclass set of X. If a relatedness score between X and element in the sense set $\{b_1, b_2, \ldots\}$ is greater than a hyponym value, the element is appended to the subclass set of X; and elements in the sense set $\{s_1, s_2, \ldots\}$ are placed into an equivalent class set of X. In addition, the ontology may also be augmented using gloss.

After the ontology is augmented, the ontology is refined. Refining the ontology, as described in more detail herein, merges and removes some unnecessary links in the augmented ontology to refine the ontology.

In one example, the relatedness score calculation method described previously is used in two steps: $Rel(s_{j,i}, s_{j,k})$ in ontology disambiguation, and in the calculation of a relatedness score between an augmented sense and a related element such as $a_i$ in hypernym(X) when augmenting the ontology using relations.

Figure 3A:
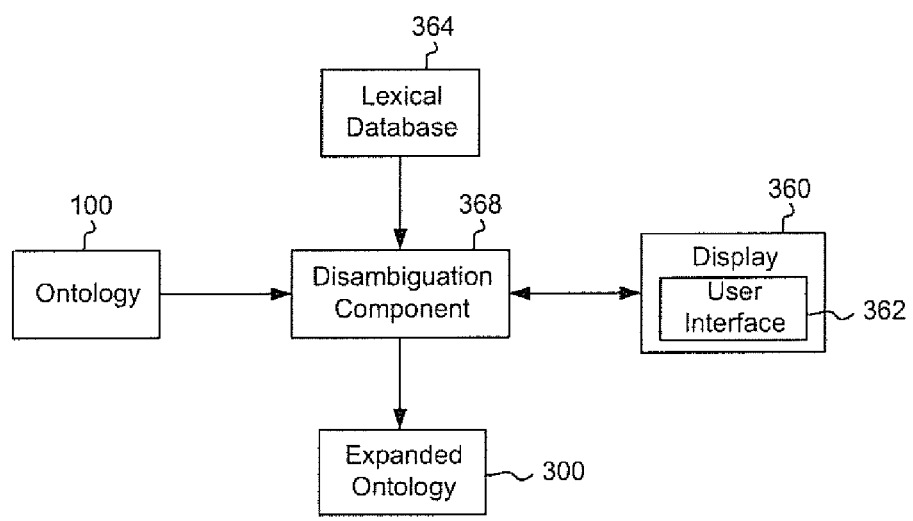
FIG. 3A shows an illustrative embodiment of a system for expanding an ontology.

FIG. 3A shows an illustrative embodiment of a system for expanding or augmenting an ontology. FIG. 3A illustrates the ontology 100 that is being expanded to generate an expanded or augmented ontology 300. A disambiguation component 368, which may be a computer or network of computers in one example or configured to operate on a computer or a network of computers, uses a lexical database 364 to disambiguate the ontology 100 and produce the augmented ontology 300. A display 360 and user interface 362 used in conjunction with the disambiguation component 368 can be used to view the ontology 100 and/or the augmented ontology 300 as well as to receive input from a user or other source during the generation of the augmented ontology 300.

Figure 3B:
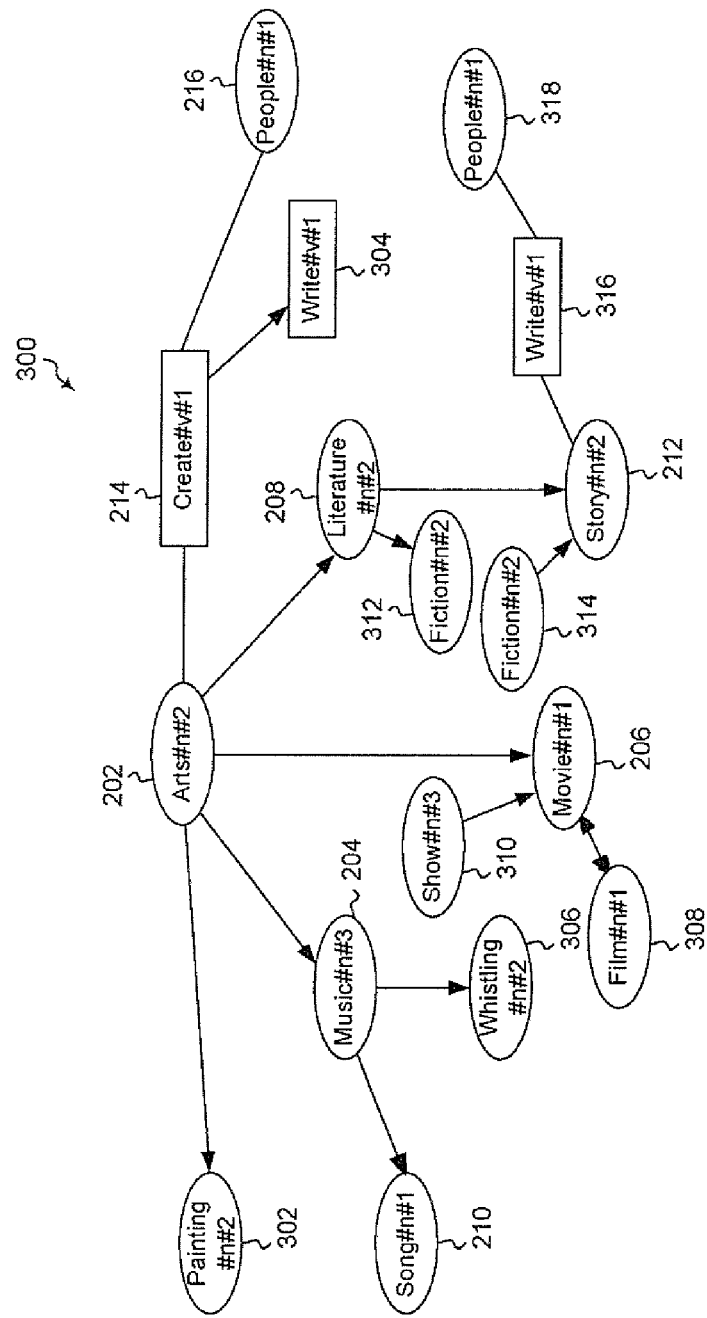
FIG. 3B shows an illustrative embodiment of an expanded ontology.

FIG. 3B shows an illustrative embodiment of the augmented ontology 300. More specifically, with continued reference to FIGS. 1-2, the expansion of the ontology 100 in FIG. 1 results in the augmented ontology 300 shown in FIGS. 3A and 3B. The ontology 100 may be expanded by determining a related sense set for each term sense, as illustrated in the ontology 200, and then adding term senses (or words) to the ontology 200 to generate the expanded ontology 300. More specifically, term senses or words in the related sense set that are sufficiently related are included in the expanded ontology 300.

In one example, the ontology can also be expanded using gloss. In this example, all stopwords are dropped from the gloss. Stopwords may include articles, adjective, adverbs, preposition, etc. After dropping stopwords, the gloss may only contain nouns, verbs and pronouns. For a concept term sense cs, all pairs (verb, word) which match a pattern (cs, verb, word) or (word, verb, cs) in the gloss of cs are found (in this case a word is a noun or a pronoun). In one example, the verb is an assumption and will be validated in the following process. The word may be abstracted to a noun when the word is a pronoun. Next, (verb,con) is disambiguated by using sense cs as the context. If the disambiguated result of the verb is not a verb sense, which means the above assumption for (cs, verb, word) is not exact, the pair is eliminated or dropped. Finally, if relatedness(cs, verb), relatedness(cs, con) and relatedness(verb, con) are greater than the gloss value, (verb, con) is appended to the concept term sense cs.

For a role term sense rs, all pairs (w1, w2) which match pattern (w1, rs, w2) in the gloss of rs are found. In this example, w1 and w2 are nouns or pronouns. Then, the words are abstracted into general concepts con1 and con2 if necessary. Next, (con1,con2) is disambiguated by using sense rs as the context. Finally, if relatedness(con1, rs), relatedness(rs, con2) and relatedness(con1, con2) are greater than the gloss value, (verb, noun) is appended to the role term sense rs.

For instance, in the disambiguated example ontology, the gloss of the concept term sense 212 (story#n#2) may contain "he writes stories for the magazines." The gloss is changed to "he writes stories magazines" by dropping stopwords (for and the) and the pair (write, he) is obtained. The pronoun "he" is abstracted to concept "people". The pair (write#v#1, people#n#1) is obtained using story#n#2 as the disambiguation context. By setting gloss value to 0.6, relatedness (people#n#1, write#v#1), relatedness(people#n#1, story#n#2) and relatedness(story#n#2, write#v#1) are greater than 0.6. As a result, (write#v#1, people#n#1) is appended to the story concept term sense 212, as depicted in FIG. 3B by the role term sense 316 and the people concept term sense 318.

In another example, the related sense sets of arts term sense 202 may include:
hypernym(arts)={creation};
hyponym(arts)={arts and crafts, decal, drawing, painting, perfumery, origami, sculpture};
synonym(arts)={art creation}.

In this example, the predetermined value of each of the hypernym, hyponym, and synonym relatedness scores may be set to 0.9. The words to be added to the expanded ontology 300 from the sense sets are then identified by generating relatedness scores for each element in each sense set. The relatedness score between arts and painting (relatedness (arts, painting)) may be 0.933. The relatedness score between the arts concept term sense 202 and drawing (from the elements identified in the hyponym(arts)) may be 0.923.

One of skill in the art can appreciate that these relatedness scores are disclosed by way of example only. A similar process is performed for each term sense in the ontology 200. After (or during) the process of determining relatedness scores for the elements in the sense sets, the elements that exceed or otherwise satisfy the relatedness requirements are added to the augmented ontology 300.

The augmented ontology 300 illustrated in FIG. 3B depicts the results of the ontology expansion. The additions illustrated in the ontology 300 reflect the words or term senses whose relatedness scores satisfied (exceed in one example) the relevant threshold relatedness score.

In FIG. 3B, a painting concept term sense 302 has been added as subclasses of the arts concept term sense 202. A whistling concept teiin sense 306 is added as a subclass of the music concept term sense 204. A show concept term sense 310 has been added as a superclass of the movie concept term sense 206. A film concept term sense 308 has been added as an equivalent of the movie concept term sense 206. Concept term senses 312, 314, and 318 and role term senses 304 and 316 have been similarly added with similar relationships (e.g., subclass, superclass, equivalent class, etc.).

The concept or role term senses added to the ontology 200 to generate the expanded ontology 300 can be added as superclasses, subclasses, and/or equivalent classes as previously described. The augmented ontology 300 improves the Semantic Web by providing an ontology that can be used to obtain a better understanding of the data and services available from the Web.

Figure 3C:
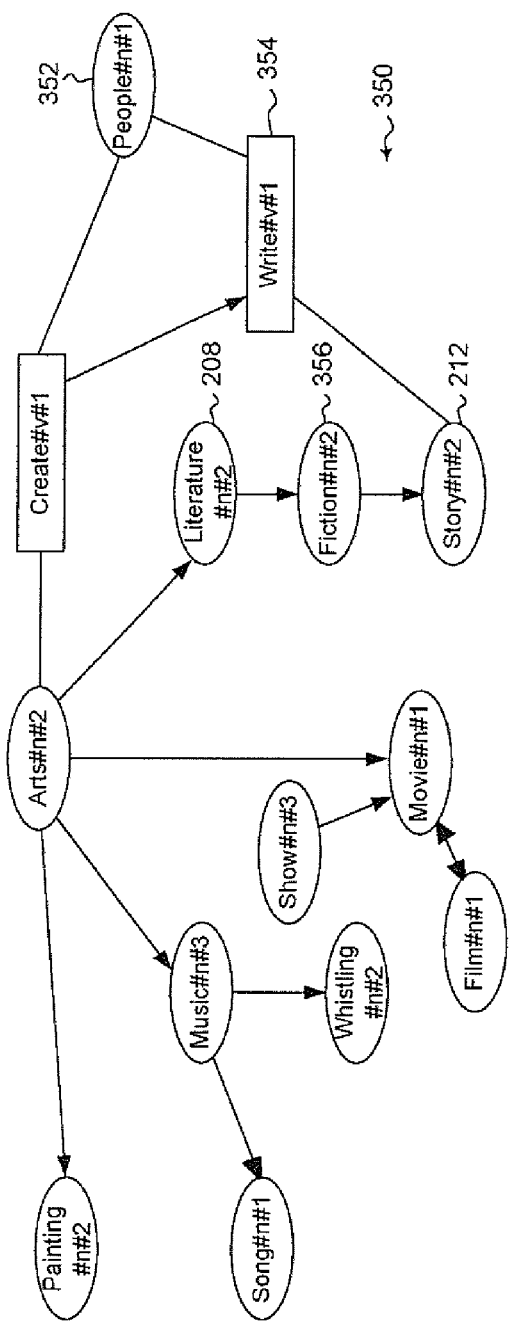
FIG. 3C shows an illustrative embodiment of the expanded ontology illustrated in FIG. 3B after refinement.

FIG. 3C shows an illustrative embodiment of the augmented ontology illustrated in FIG. 3B after refinement. Refinement of the ontology 300 results in a refined ontology 350. Refining the ontology 350 merges links and removes unnecessary links. For instance, concept term senses and role term senses that are the same, are merged. FIG. 3B, for example, illustrates two fiction concept term senses 312 and 314, two write role term senses 304 and 316, and two people concept term senses 216 and 318. When these are the same, they are merged as people concept term sense 352, fiction concept term sense 356, and role term sense 354.

The removal of unnecessary links may be performed using certain rules. If one link can be inferred from other links, by way of example, then the link is omitted. For example, the story concept term sense 212 is a subclass of the literature concept term sense 208 in FIG. 3B. This relationship can be inferred from the relationships where the fiction concept term sense 312 is a subclass of the literature concept term sense 208 and the fiction concept term sense 314 is a superclass of the story concept term sense 212. Because the fiction concept term senses 312 and 314 are merged, the inferred relationship is illustrated in FIG. 3C where the story concept term sense 212 is a subclass of the fiction concept term sense 356, which is a subclass of the literature concept term sense 208. FIG. 3C thus illustrates an example of refining an augmented ontology by merging concept term senses or role term senses that are the same and by removing unnecessary links.

Figure 4:
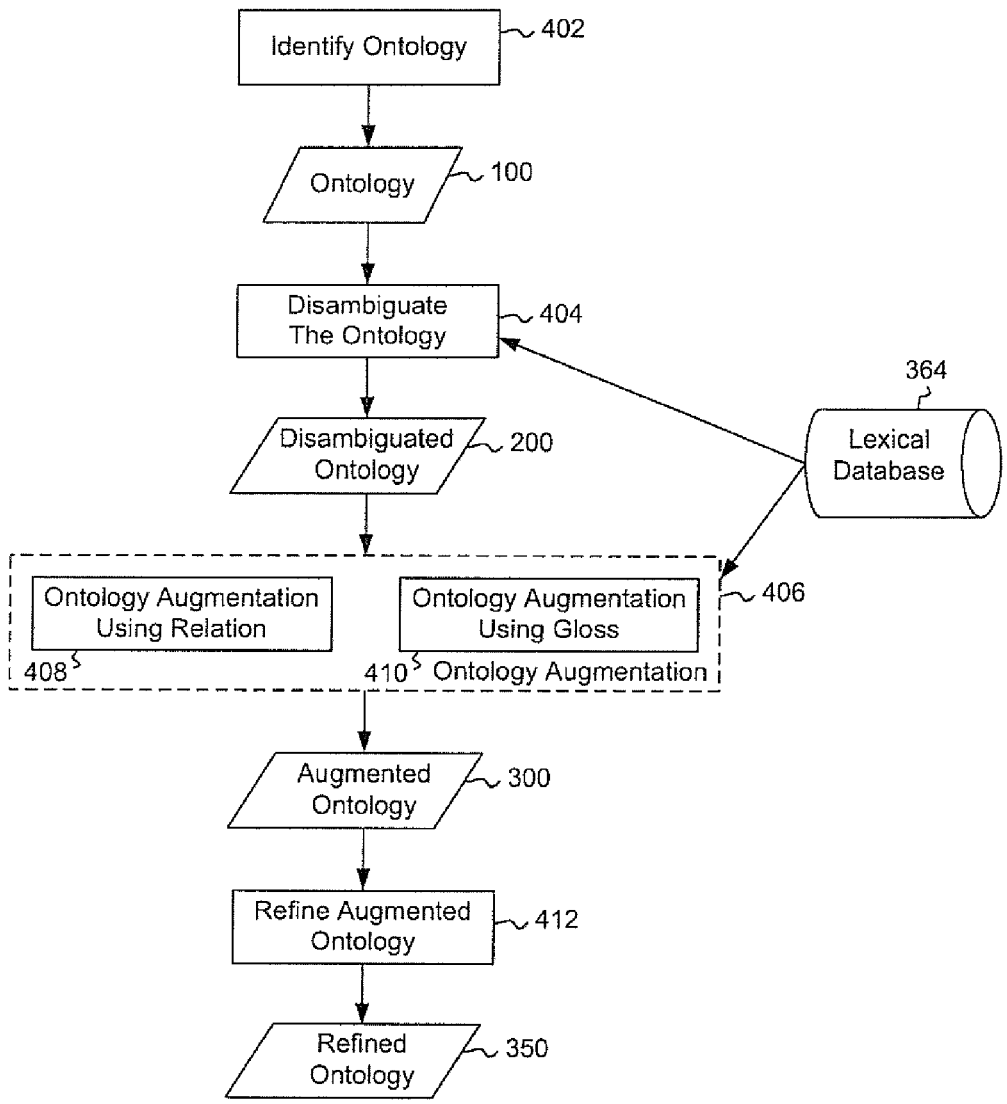
FIG. 4 shows an illustrative example of a method for expanding an ontology.

FIG. 4 shows a flowchart of an illustrative method for expanding an ontology. In box 402 ("Identify Ontology"), the ontology 100 is identified. As previously stated, the ontology 100 can be a portion of an existing ontology or a newly generated ontology, or a combination thereof.

In box 404 ("Disambiguate the Ontology"), the ontology 100 is disambiguated to generate the disambiguated ontology 200. The lexical database 364 may be used to disambiguate the ontology 100 as described herein. This may include, for example, identifying nearest word sets, identifying word sense sets, identifying context for each sense or the like.

In box 406 ("Augment the Ontology"), the expanded ontology 200 is augmented to generate the augmented ontology 300. The expanded ontology 200 can be augmented using relations in box 408 ("Ontology Augmentation Using Relation") and/or using gloss in box 410 ("Ontology Augmentation Using Gloss").

In box 412 ("Refine the Augmented Ontology"), the augmented ontology 300 is refined to generate the refined ontology 350. The augmented ontology may be refined, for example, by combining concept term senses, role term senses, etc., as previously described.

Figure 5:
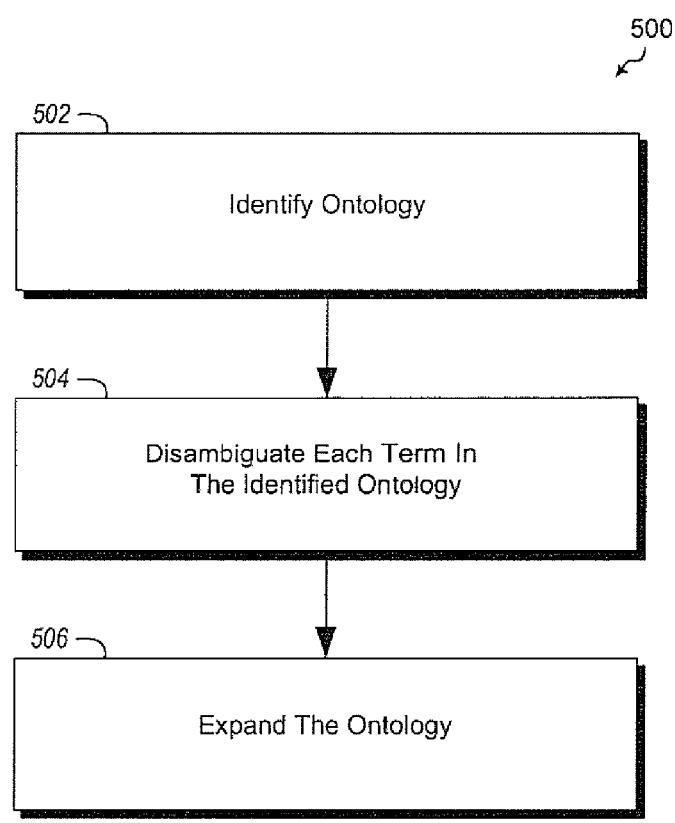
FIG. 5 shows a flowchart of an illustrative embodiment of a method for expanding an ontology.

FIG. 5 shows a flowchart of an illustrative embodiment of a method 500 for expanding an ontology. In block 502 ("Identify Ontology"), an ontology is identified. The ontology can be identified, for example, by searching an existing ontology for an area of knowledge or a particular concept. The ontology may be identified by selecting some of the nodes surrounding the particular concept or within the area of knowledge. In some examples, the extent or size of the ontology being identified can be predetermined. In some examples, the process of expanding the ontology is performed on existing ontologies and the expansion is performed when a particular ontology or portion of an ontology is identified or otherwise selected.

When expanding the ontology, the ontology to be expanded may already be identified or predetermined and embodiments of the ontology expansion may begin with an existing or predetermined ontology. As a result, there may be no need to search for the ontology or otherwise select the ontology. Further, the ontology being expanded may be a fragment or portion of a larger ontology.

In block 504 ("Disambiguate Each Term in the Identified Ontology"), each term in the identified or predetermined ontology is disambiguated. Disambiguating each term in the ontology can include identifying the right or correct term senses for each term in the ontology which have the maximum relatedness score. The disambiguation of the terms in the ontology can clarify the terms.

The related sense sets can be identified using a lexical database, for example WordNet. The related sense sets may include a set of hypernyms, a set of hypernyms, a set of synonyms, or the like. The related sense sets are not limited to these examples, but may include others as previously stated.

After the related sense sets are identified, a relatedness score may be determined, by way of example only, for each element in each related sense set using, for example, candidates as previously described. The elements used to expand the ontology are those elements whose relatedness score exceeds a predetermined relatedness score. The elements can be added as a superclass, a subclass, or an equivalent class to the term sense being expanded.

In block 506 ("Expand the Ontology"), the ontology is expanded with the elements identified during the disambiguation process. This may include adding the qualifying elements as superclasses, subclasses, equivalent classes or some related classes to the term senses in the ontology.

Ontology expansion can be performed automatically or semi-automatically. After the ontology is identified or constructed, the ontology can be revised or expanded in accordance with the ontology expansion described herein. For instance, the ontology can be traveled (since it often has a tree-like organization) automatically to identify nearest word sets or to identify context and the like. The context can be determined from other terms or term senses in the ontology. Further, the related sense sets and relatedness scores can also be obtained automatically without user input. Finally, the ontology can be expanded by adding nodes to the ontology. The expanded ontology can be saved automatically for use, reviewed by a person, or the like.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can became significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

Figure 6:
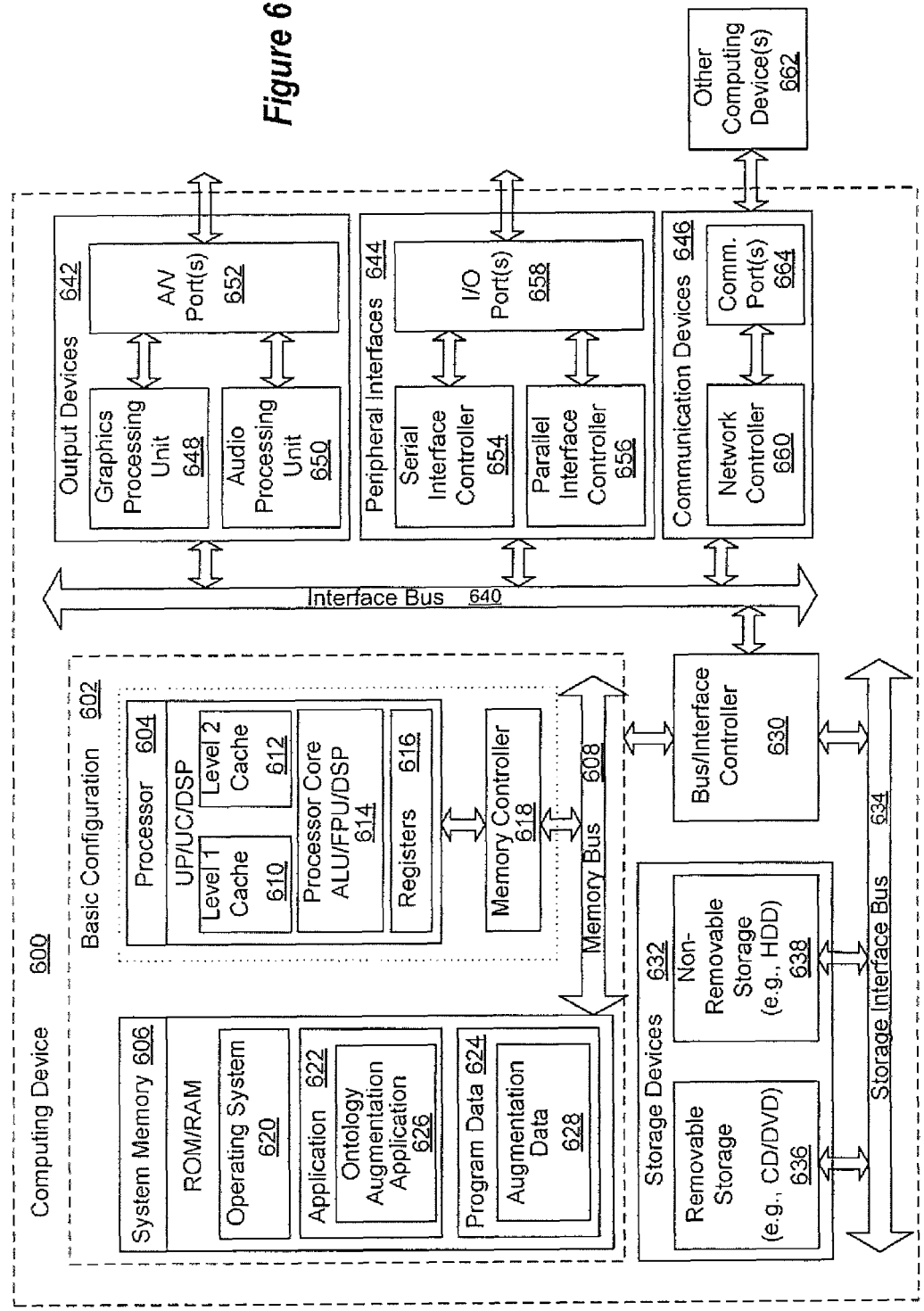
FIG. 6 is a block diagram of an illustrative embodiment of a computing device that is arranged for expanding an ontology.

FIG. 6 is a block diagram of an illustrative embodiment of a computing device 600 that is arranged for expanding an ontology. In a very basic configuration 602, computing device 600 typically includes one or more processors 604 and a system memory 606. A memory bus 608 may be used for communicating between processor 604 and system memory 606.

Depending on the desired configuration, processor 604 may be of any type including but not limited to a microprocessor (µP), a microcontroller (µC), a digital signal processor (DSP), or any combination thereof. Processor 604 may include one more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624. Application 622 may include an ontology expansion application 626 that is arranged or configured to expand an ontology. Program data 624 may include expansion data 628 for analyzing an ontology and/or for expanding the ontology. In some embodiments, application 622 may be arranged to operate with program data 624 on operating system 620 such that an expanded ontology is generated. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A method for expanding an ontology, the method comprising:
   identifying, by a processing device, the ontology, the ontology including a plurality of terms including concept terms and role terms;
   disambiguating, by the processing device, the plurality of terms in the ontology using a lexical database to identify additional senses, wherein disambiguating the plurality of terms in the ontology further comprises identifying a term sense for each of the plurality of terms;
   determining a plurality of sense sets from the lexical database, wherein each of the plurality of sense sets includes at least one element;
   identifying a relatedness score between the term sense identified for each of the plurality of terms in the ontology and elements in the plurality of sense sets, wherein each element in the plurality of sense sets having a corresponding relatedness score that exceeds a predetermined relatedness score is included in the additional senses; and
   expanding, by the processing device, the ontology with the additional senses by adding at least one of the additional senses to the ontology.

2. The method of claim 1, wherein identifying the ontology further comprises identifying a portion of the ontology.

3. The method of claim 1, wherein identifying a term sense for each of the plurality of terms further comprises identifying a nearest word set for each of the plurality of terms.

4. The method of claim 1, wherein identifying a term sense for each of the plurality of terms further comprises identifying a context for each of the plurality of terms.

5. The method of claim 1, wherein the plurality of sense sets include one or more of:
   a hypernym sense set;
   a hyponym sense set;
   a holonym sense set;
   a meronym sense set;
   a troponym sense set;
   a participle sense set; or
   a root adjective sense set.

6. The method of claim 1, wherein each of the relatedness scores is determined using a sense of the term to provide context for the elements in the plurality of sense sets.

7. The method of claim 1, wherein each of the additional senses is added to the ontology as a superclass, as a subclass, or as an equivalent class.

8. A method for expanding an ontology, the method comprising:
   identifying, by a processing device, a context for each term in the ontology;
   determining, by the processing device, a term sense for each term using the context for each term;
   disambiguating, by the processing device, the term sense of each term using a plurality of sense sets from a lexical database and the context for each term to identify additional senses;
   determining, by the processing device, a relatedness score between the term sense determined for each term and elements in one or more of the plurality of sense sets;
   identifying, by the processing device, elements in the plurality of sense sets having relatedness scores that exceed a threshold;
   expanding, by the processing device, the ontology with the additional senses by adding at least one of the additional senses to the ontology; and
   adding, by the processing device, at least one of the elements having a corresponding relatedness score that exceeds the threshold to the ontology.

9. The method of claim 8, wherein other terms in the ontology provide the context for each term.

10. The method of claim 8, wherein the plurality of sense sets include one or more of:
    a hypernym sense set;
    a hyponym sense set;
    a holonym sense set;
    a meronym sense set;
    a troponym sense set;
    a participle sense set; or
    a root adjective sense set.

11. The method of claim 8, wherein the elements are added to the ontology as one of: a superclass to the associated term sense; a subclass to the associated term sense; or an equivalent class to the associated term sense.

12. The method of claim 8, further comprising determining a gloss for each term, wherein the gloss and the relatedness scores are used to augment the ontology.

13. The method of claim 12, wherein when the gloss includes a pattern, the method includes:
    finding pairs that match the pattern;
    disambiguating the pairs that match the pattern using a sense as context; and
    appending each of the pairs to the term sense when the relatedness scores of each of the pairs is greater than a gloss value.

14. A system for generating an expanded ontology from an ontology, the system comprising:
    a processor; and
    a computer-readable medium having stored thereon:
    a lexical database that stores a plurality of elements in one or more sense sets, each element including a term sense; and
    a disambiguation component executable by the processor to expand the ontology using the one or more sense sets in the lexical database to generate the expanded ontology, wherein the disambiguation component determines a context for each term sense in the ontology and determines a relatedness score between each term sense in the ontology and each of the elements in the one or more sense sets, wherein the disambiguation module generates the expanded ontology by adding elements in the one or more sense sets having relatedness scores that exceed a threshold relatedness score to the ontology.

15. The system of claim 14 wherein the one or more sense sets include one or more of:
    a hypernym sense set;
    a hyponym sense set;
    a holonym sense set;
    a meronym sense set;
    a troponym sense set;
    a participle sense set; or
    a root adjective sense set.

16. The system of claim 14 wherein the disambiguation component is executable by the processor to determine the relatedness score using the context for each term sense in the ontology, wherein the context for each term sense is provided by other term senses in the ontology.

17. The system of claim 14, wherein the disambiguation component is executable by the processor to add each element having a relatedness score that exceeds the threshold relatedness score as one of a superclass, a subclass, or an equivalent class.

18. The system of claim 14, wherein the disambiguation component is executable by the processor to generate the expanded ontology automatically without human assistance.

19. The system of claim 14, wherein the disambiguation component is executable by the processor to determine a gloss for each term sense, wherein the gloss includes a pattern, wherein pairs matching the pattern are disambiguated and appended to the ontology when relatedness scores associated with the pair are greater than a gloss value.

20. A method for augmenting an ontology, the method comprising: identifying, by a processing device, an ontology to augment;
    disambiguating, by the processing device, the ontology to generate a disambiguated ontology, wherein disambiguating the ontology includes identifying a term sense for each term of the ontology;
    assigning, by the processing device, sense sets from a lexical database to each term in the ontology, the sense sets each include at least one word;
    determining, by the processing device, a relatedness score for each of the identified term senses and words in the sense sets,
    augmenting, by the processing device, the disambiguated ontology to generate an augmented ontology by adding at least one of the words in the one or more sense sets that has a relatedness score that exceeds a threshold relatedness score to the disambiguated ontology; and
    refining, by the processing device, the augmented ontology.

21. The method of claim 20, wherein augmenting the disambiguated ontology further comprises:
    augmenting the disambiguated ontology using relations; and
    augmenting the disambiguated ontology using glosses.

22. The method of claim 21, wherein
    augmenting the disambiguated ontology using relations comprises:
    determining a similar sense set for each of the one or more term senses and adding new term senses to the augmented ontology based on each similar sense set; and
    including term senses having a relatedness score greater than a second threshold relatedness score; and
    augmenting the disambiguated ontology using glosses comprises:
    dropping stopwords from a gloss for each of the one or more term senses; and
    determining gloss values for pairs in the gloss, wherein term senses are added to the augmented ontology when the gloss values exceed a threshold gloss value.

23. The method of claim 20, wherein refining the ontology further comprises:
    merging term senses in the augmented ontology that are the same; and
    inferring relationships between term senses, wherein the relationships are added as relations in the augmented ontology, the relations including one of a superclass, a subclass, or an equivalent class.

24. The method of claim 20, wherein disambiguating the ontology further comprises:
    generating disambiguation candidates from the terms in the ontology; and
    determining a relatedness score for each candidate, wherein at least the candidate with a best relatedness score is a desired sense of the terms in the ontology.

25. The method of claim 24, wherein the relatedness score for each candidate includes a sum of relatedness scores among all pairs of terms in each candidate.

* * * * *

UNITED STATES PATENT AND TRADEMARK OFFICE
CERTIFICATE OF CORRECTION

PATENT NO. : 8,566,363 B2
APPLICATION NO. : 13/376804
DATED : October 22, 2013
INVENTOR(S) : Fang It is certified that error appears in the above-identified patent and that said Letters Patent is hereby corrected as shown below:

In the Specification:

In Column 3, Line 39, delete "tents" and insert -- terms --, therefor.

In Column 8, Line 33, delete "teiin" and insert -- term --, therefor.

In Column 10, Line 58, delete "became" and insert -- become --, therefor.

Signed and Sealed this
Twenty-seventh Day of May, 2014

Michelle K. Lee
*Deputy Director of the United States Patent and Trademark Office*